3,068,207
PROCESS FOR INCREASING THE DYEABILITY OF LINEAR CONDENSATION POLYMER ESTERS WITH CHELATABLE DYES

Joseph Iannicelli, Wilmington, Del., assignor to E. I. du Pont de Nemours and Company, Wilmington, Del., a corporation of Delaware
No Drawing. Filed Sept. 21, 1959, Ser. No. 841,011
12 Claims. (Cl. 260—75)

This invention relates to fiber- and film-forming synthetic linear condensation polyesters and thin shaped articles which are produced therefrom. More particularly, it is concerned with thin shaped structures of a modified linear condensation polyester, especially a terephthalate polyester, which has affinity for certain chelatable dyes.

Synthetic linear condensation polyesters, particularly terephthalate polyesters, have attracted high commercial interest for many uses owing to their high tenacity, flexibility, crease resistance, low moisture absorption, and other valuable properties. One of the chief disadvantages associated with polyesters hitherto has been the difficulty in dyeing or printing fabrics, films, and other thin shaped articles composed thereof with commercially available dyes, inks, and other coloring materials. Chelatable dyes, i.e., colored organic substances containing two or more functional groups capable of forming chelate complexes with various metals (such as dyes forming chelate complexes with chromium salts), display relatively little affinity for untreated polyesters; furthermore, use of carriers does not remedy this difficulty, the carriers ordinarily affecting the rate of dyeing rather than the equilibrium amount of dye transferred to the polymer.

It is an object of the present invention to provide synthetic linear condensation polyesters in the form of thin shaped articles which have affinity for chelatable dyes. Another object is to provide modified synthetic linear terephthalate polyesters in the form of thin shaped articles which have affinity for chelatable dyes. A further object is to provide a process for the production of polyesters from which thin shaped articles having affinity for chelatable dyes can be prepared. These and other objects will become apparent in the course of the following specification and claims.

In accordance with the present invention, a synthetic linear condensation polyester in which the end groups are predominantly hydroxyl groups is prepared from a dicarboxylic acid or ester-forming derivative thereof and an excess of a glycol or ester-forming derivative thereof, the intrinsic viscosity of the polyester, as defined hereinafter, being at least 0.3, preferably at least about 0.5. Such a polyester may be represented by the formula HO—G—(OOC—A—COO—G)$_n$—OH, where —G— and —A— are divalent organic radicals corresponding, respectively, to the radicals in the initial glycol, G(OH)$_2$, or ester-forming derivative thereof, and in the initial dicarboxylic acid, A(COOH)$_2$, or ester-forming derivative thereof, and $n$ is a number such that the polyester has an intrinsic viscosity of at least 0.3, preferably at least about 0.5. For convenience, the hydroxyl-terminated synthetic linear condensation polyester may be designated briefly as HO—Q—OH, where —Q— is equal to —G(OOCACOOG)$_n$—.

In accordance with the invention the polyester, HO—Q—OH, is contacted in the melt with a mixture of (a) a minor amount of a dianhydride having the formula R[(CO)$_2$O]$_2$, in which

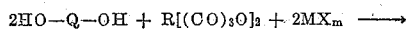

is an organic radical characterized in that no two of the attached carboxyl substituents are joined to the same carbon atom in the radical (i.e., each of the indicated valence bonds in radical

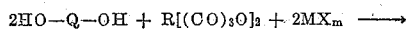

emanate from a different carbon atom) and (b) a salt of a chelate-forming metal. Preferably, the polyester is contacted with a mixture of the dianhydride and a salt of a chelate-forming metal selected from the class consisting of chromium, copper, cobalt, aluminum, iron, and nickel. The mixture is subjected to a temperature sufficient to maintain it in the molten state for a short period; that is, no more than about 30 minutes, during which time it is formed into the desired thin shaped structure and cooled.

The following equation illustrates the reaction between the polyester, the dianhydride, and the metallic salt:

$2HO-Q-OH + R[(CO)_3O]_2 + 2MX_m \longrightarrow$

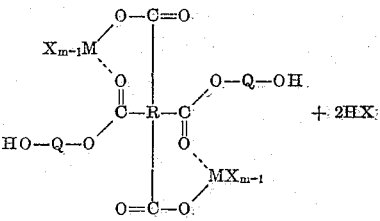

$+ 2HX$ where —M— designates an atom of the metal, $m$ designates its valence state, —X refers to an equivalent weight of an anion, and the other symbols are as defined above. Each of the anhydride groups reacts with a hydroxyl end group of a polyester chain with simultaneous formation of a carboxylic acid group, accompanied by formation of chelate complex between the metallic salt and each pair of carboxylate radicals resulting from the opening of an anhydride ring. Cross-linking does not become a problem unless the reaction time is unduly prolonged, since the carboxylate salt linkage in the chelate complex reacts more slowly than do the anhydride groups, and the number of hydroxyl groups available for reaction is relatively limited.

As indicated above, only a minor amount of the dianhydride is employed in the reaction, usually between about 0.25 and about 10 mol percent, based on the number of mols of the recurring radical —A— in the polyester; i.e., based on the number of mols of dicarboxylic acid used to form the polyester. It is also preferred that approximately two mols of the metallic salt be used for each mol of the dianhydride. The product therefore comprises a copolyester, wherein the recurring ester linkages are an integral part of the polymer chain, having repeating unit components defined by the formulae:

(a)    [—O—G—(OOC—A—COO—G)$_n$—]

and (b)

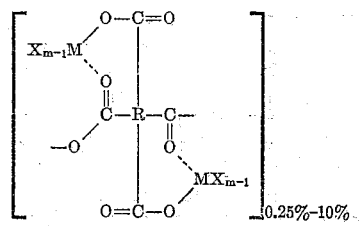

0.25%–10% wherein

—G—, —A—, $-\overset{|}{\underset{|}{R}}-$, —M—, —X, $m$, and $n$ are as defined above, the subscript percentage values in Formula b indicating the mol percentage range of the radical component, based on the number of mols of radical —A— in Formula a.

The term, "thin shaped structure," as used herein, refers to extruded articles having a shape such that at least one dimension is relatively quite large and at least one dimension is relatively quite small. The term thus comprehends filaments, fibers, bristles, ribbons, films, etc.

The glycol, G(OH)$_2$, from which the polyester is prepared may be any suitable dihydroxy compound in which the hydroxyl groups are attached to saturated carbon atoms. Thus, the radical —G— may be of the form —CM$_2$Y$_p$CH$_2$—, where $p$ is 0 or 1 and Y represents an alkylene radical, a cycloalkylene radical, a bis-alkylene ether radical, an arylene radical, or other suitable organic radical. Examples of suitable glycols include ethylene glycol, butylene glycol, decamethylene glycol, and cis- or trans-p-hexahydroxylylene glycol. If desired, mixtures of such glycols may suitably be used. It is generally preferred that the radical —G— contain from 2 to about 12 carbon atoms; however, small amounts, e.g., up to about 15 mol percent, of a higher glycol may be used, such as a polyethylene glycol. In place of the glycols, their ester-forming derivatives may be used; i.e., derivatives of the glycols which readily undergo polyesterification with dicarboxylic acids or derivatives thereof. For example, a cyclic oxide from which the corresponding glycol can be derived by hydrolysis may be used.

The dicarboxylic acid, A(COOH)$_2$, may be selected from a wide range of compounds in which A is aliphatic, cycloaliphatic, or aromatic. Mixtures of various dicarboxylic acids may suitably be used to form copolyesters. Among various dicarboxylic acids which may be used are adipic acid, sebacic acid, hexahydroterephthalic acid, terephthalic acid, 2,6- or 2,7-naphthalic acid, diphenoxyethane-4,4'-dicarboxylate, bis - carboxyphenyl ketone, and p,p'-sulphonyldibenzoic acid. In a preferred embodiment of the invention, at least about 75% of the dicarboxylic acid constituent of the polyester is terephthalic acid; i.e., at least about 75% of the recurring structural units are units of the formula:

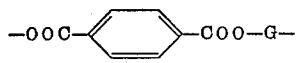

wherein G is a glycol as defined above. In this preferred embodiment of the invention, terephthalic acid may be the sole dicarboxylic acid constituent or up to about 25% of a second dicarboxylic acid; e.g., one of those listed above, may be used.

In place of the dicarboxylic acid, an ester-forming derivative of it may be used; i.e., a derivative of the dicarboxylic acid which readily undergoes polyesterification with a glycol or derivative thereof. For example, a lower alkyl ester of the dicarboxylic acid may be used, such as the dimethyl ester. Under suitable conditions, an acid chloride may be used; thus, bis-2-hydroxyethyl terephthalate suitable for polycondensation may be prepared by the reaction of terephthaloyl chloride with at least 10 mols of ethylene glycol containing not more than 2% water in the presence of an acid acceptor such as the alkali and alkaline earth oxides, hydroxides, carbonates, and bicarbonates. As an illustration of another alternative, hexachloro-p-xylene can be dissolved in at least 10 mols of ethylene glycol containing 0.05 to 5.0% water at a temperature of 100° C. or above and reaction to form bis-2-hydroxyethyl terephthalate can be effected at 125° C. or above, using an inorganic base to neutralize the by-product hydrogen chloride.

Any dianhydride may be used which is thermally stable at the melting point of the polyester; i.e., usually at about 250° C. to 300° C. In general, dianhydrides, in which each of the four carboxyl groups from which the two anhydride rings are formed are attached to separate carbon atoms are thermally stable and satisfactory for use in accordance with the invention. Compounds containing reactive functional groups other than the two anhydride functions will usually be avoided; however, the compound may contain substituents which are not reactive with the molten polyester medium, such as fluorine and chlorine substituents. Among anhydrides which are suitable are pyromellitic dianhydride, 3,6-dichloropyromellitic dianhydride, naphthalene-1,4,5,8-tetracarboxylic dianhydride, diphenyl-3,4,3',4'-tetracarboxylic dianhydride, butane-1,2,3,4-tetracarboxylic dianhydride, and 2,2-bis(3,4-dicarboxyphenyl) propane dianhydride.

Together with the dianhydried is added a salt of a chelate-forming metal selected from the class consisting of chromium, copper, cobalt, aluminum, iron, and nickel is used. These metals are the commonest chelate-producing metals, as discussed by Lubs in his "Chemistry of Synthetic Dyes and Pigments," pages 426–7 (Reinhold Publishing Corp., New York, 1955); however, in some instances, other metals may be used. The presence of the metallic salt is critical, since in its absence the copolyester is not dyeable with chelatable dyes. Since it is desired that chelate complexes involving the metal be formed, the metal should be added in a valence state in which it is known to participate in chelation. Valence states of the metals which are specifically preferred for this reason are the chromium (III), copper (II), cobalt (II), aluminum (III), iron (II), iron (III), and nickel (II) states. The nature of the anion in the metallic salt is not critical. Usually the anion is merely selected such that the salt will be soluble in the molten polyester. The acetate is frequently used.

When the fibers or other thin shaped structures of the modified polymers are dyed with chelatable dyes, bright wash-fast colors are formed. Prior to dyeing, polymers modified with up to about 2 mol percent of chromium, copper, cobalt, iron, and nickel salts exhibit pale tints of green, blue, bluish-green, reddish-brown, and green, respectively. At higher mol percentage modifications the tints are intensified, and yarns prepared from these modified polymers may be used directly, without dyeing, for purposes where these spun tints or colors are desired, as in novelty fabrics, etc. By employing appropriate chelatable dyes, the spun colors may be modified or intensified or, if desired, a different color may be developed on the fiber. In the case of the aluminum salt, the modified polymer is substantially colorless as spun, and the polymer appears similar to unmodified polymer until treated with a chelatable dye.

The dianhydried and the metallic salt may be added directly to the molten polyester, or one or both of the additives may be mixed with the solid polyester in powder or flake form, followed by melting of the mixture. After the additives have been contacted with the molten polyester, the composition may be extruded immediately to form the desired thin shaped structure. The maximum allowable hold-up time of the polymer in the molten state in contact with the dianhydried additive is 30 minutes. Preferably, the hold-up time in the molten state is no more than about 15 minutes. Under these conditions the novel product is a substantially linear copolyester. When the hold-up time exceeds 30 minutes, however, the polyester begins to change in character so that it is no longer substantially linear, as indicated by the fact that when the modified polymer is heated in the molten state for more than 30 minutes it can no longer be spun into filaments from a standard spinneret pack.

The intrinsic viscosity of the polymer is used herein as a measure of the degree of polymerization of the polymer and may be defined as:

$$\text{limit } \frac{\ln \eta_r}{C} \text{ as } C \text{ approaches } 0$$

wherein $\eta_r$ is the viscosity of a dilute solution of the polymer in a solvent divided by the viscosity of the solvent per se measured in the same units at the same temperature; and C is the concentration in grams of the polymer per 100 ml. of solution. Fomal, which comprises 58.8 parts by weight of phenol and 41.2 parts by weight of trichlorophenol, is a convenient solvent for measuring the intrinsic viscosity of linear polyesters, and intrinsic viscosity values reported herein are with reference to Formal as a solvent.

In accordance with the present invention, the initial polyester which is reacted with the dianhydride has an intrinsic viscosity of at least about 0.3. Preferably, the intrinsic viscosity is at least about 0.5, especially when it is desired to spin the modified polymer into filaments using a standard spinneret pack assembly. When a polyester having an intrinsic viscosity of less than about 0.3 is used, the number of hydroxyl groups in the polyester is quite high, and it is difficult to control the reaction to prevent cross-linking.

The copolyester prepared in accordance with the invention should contain between about 0.25 and about 10 mol percent of the recurring structural unit derived from the dianhydride and the metallic salt, based on the number of mols of structural units derived from the dicarboxylic acid radical, —A—. As indicated previously, it is preferred that approximately two mols of the metallic salt be used for each mol of the dianhydride, although this ratio is not critical. Polyesters containing less than about 0.25 mol percent of the recurring structural unit derived from the dianhydride and the metallic salt usually have only a relatively low affinity for chelatable dyes. Polyesters containing about 10 mol. percent of the dianhydride modifier have a very high affinity for chelatable dyes, and higher concentrations do not lead to appreciable increases in dyeability. Concentrations of 0.5 to 5 mol percent of the dianhydride modifier are regarded as optimum and are preferred.

The following examples are given to illustrate further the nature of the invention, although they are not intended to be limitative.

EXAMPLE 1

26.6 parts of solid pyromellitic dianhydride and 55 parts of chromium (III) acetate are thoroughly mixed in a ball mill with 2270 parts of dried polyethylene terephthalate flake having an intrinsic viscosity of 0.66 and the mixture is dried two hours under vacuum at 250° C. These concentrations of pyromellitic dianhydride and chromium acetate are equivalent to approximately 1 and 2 mol percent, respectively, of the terephthalate content of the polymer. The mixture is melted and spun at 295° C. through a 34-hole spinneret plate in which the orifices have diameters of 0.012 inch, using a standard filter pack comprising sand supported by a screen assembly as described by Hull et al. in U.S. Patent 2,266,368. The yarn is wound at a speed of approximately 1206 yards per minute. The maximum hold-up time of the polymer in the molten state is about 10 minutes. The yarn is drawn 3.43 times its extruded length to produce a 70-denier yarn. A swatch of knit tubing prepared from this yarn is dyed with a chelatable dye having the structure given in Formula A below.

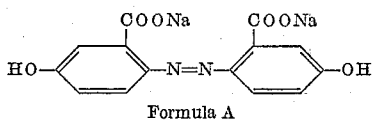

Formula A

The fabric weight is 8.67 grams and the dyeing is carried out for one hour at a temperature of 125° C., using 434 ml. of an aqueous solution of 5% of the dye, 5% sulfuric acid, and 10% sodium sulfate decahydrate (all percentages based on fabric weight). The resulting fabric is found to have a deep yellow color.

In a series of control experiments, yarn is spun and drawn under the same conditions from the following polymers:

(1) Polymer prepared as above, except that the pyromellitic dianhydride is omitted;
(2) Polymer prepared as above, except that the chromium acetate is omitted;
(3) Polymer prepared as above, except that both the pyromellitic dianhydride and chromium acetate are omitted.

Fabrics made from these yarns are dyed with the dye shown in Formula A under the same dyebath conditions. In each case, the dye uptake is negligible and the fabrics are substantially uncolored by the dye.

Another sample of fabric made from the polymer prepared using the pyromellitic dianhydride and chromium acetate is dyed with a dye having the structure shown in Formula B below:

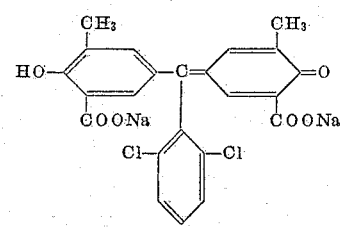

Formula B

The dyeing is carried out at 100° C. for 30 minutes, using an aqueous solution of 0.5% of the dye, 6% acetic acid, and 10% sodium sulfate decahydrate (all percentages based on fabric weight). The fabric is dyed an attractive shade of pale blue (dye bath practically exhausted). A control sample of fabric of polymer prepared as above, except that the pyromellitic dianhydride and chromium acetate are omitted, is undyed under the same dyebath conditions.

A third sample of fabric made from the polymer prepared using the pyromellitic dianhydride and chromium acetate is dyed with a dye having the structure shown in Formula C below:

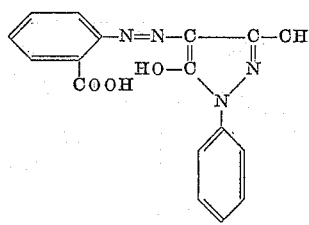

Formula C

The dyeing is carried out at 125° C. for one hour, using an aqueous solution of 1% of the dye, based on fabric weight. The fabric is dyed a deep shade of yellow, whereas a control sample of unmodified polyethylene terephthalate is substantially unaffected by the dye.

When the mixture of polyethylene terephthalate, pyromellitic dianhydride, and chromium acetate is held in the molten state at 295° C. prior to spinning from the same spinneret pack assembly, it is found that the spinning of filaments becomes more difficult as the hold-up time is increased. When the hold-up time exceeds 30 minutes, spinning can no longer be accomplished, apparently as a result of cross-linking in the modified polymer.

EXAMPLE 2

2.2 parts of solid pyromellitic dianhydride and 4.6 parts of chromium (III) acetate are thoroughly mixed in a ball mill with 137 parts of dried poly(trans-p-hexahydroxylylene terephthalate) flake having an intrinsic viscosity of 0.5 and the mixture is dried two hours under vacuum at 240° C. These concentrations of pyromellitic dianhydride and chromium acetate are equivalent to approximately 2 and 4 mol percent, respectively, of the terephthalate content of the polymer. The mixture is melted, spun at 295° C. through a 34-hole spinneret plate in which the orifices have diameters of 0.009 inch, and wound up at 1206 yards per minute. The maximum hold-up time of the polymer in the molten state is about 10 minutes. The yarn is drawn 2.9 times its extruded length to produce a 70-denier yarn, which is knitted into fabric. When dyed with the dye shown in Formula A of Example 1 under the same dye bath conditions, the fabric is dyed a deep yellow color. A sample of unmodified poly(trans-p-hexahydroxylylene terephthalate), when subjected to the same dye bath conditions, exhibits only a faint tint of yellow.

EXAMPLE 3

In each experiment of a series summarized in Table I, 192 parts of polyethylene terephthalate flake having an intrinsic viscosity of 0.6 is thoroughly mixed in a ball mill with 3.3 parts of pyromellitic dianhydride and the indicated number of parts of a metallic salt (on the basis of the anhydrous salt), as listed in the table. In each case the concentration of pyromellitic dianhydride and the metallic salt are equivalent to approximately 1.5 and 3 mol percent, respectively, of the terephthalate content of the polymer. After the mixtures are dried under vacuum at 250° C. for two hours, yarn is spun and drawn from each mixture following the procedure described in Example 1. Swatches of knit tubing are prepared and dyed in an aqueous dye bath containing 5% (based on fabric weight) of the indicated dye at 125° C. for one hour. Bright, wash-fast shades of the colors indicated in the table are obtained. Control samples of fabric prepared from unmodified polyethylene terephthalate yarns exhibit negligible dye uptake in each case, however.

above. Among such dyes are many of the acid dyes, especially those derived from aminohydroxycarboxylic acid intermediates, as well as certain oxime and polyhydroxy dyes. In general, dyes containing sulfonic acid substituents have relatively low substantivity and are thereby to be avoided.

It will be apparent that many widely different embodiments of this invention may be made without departing from the spirit and scope thereof, and therefore it is not intended to be limited except as indicated in the appended claims.

I claim:

1. The process of modifying synthetic linear fiber-forming glycol dicarboxylic acid polyesters which comprises forming a molten mixture of (a) the polyester, (b) a dianhydride present in the amount between about 0.25 and about 10 mol percent based on the number of mols of the recurring acid residues in the polyester, said anhydride having the formula $R[(CO)_2O]_2$ in which R is an organic radical characterized in that no two of the attached carboxyl substituents are joined at the same carbon atom in the radical and is thermally stable at 250° C. to 300° C., and (c) a salt of a chelate-forming metal soluble in the melted polyester, and thereafter extruding the mixture within 30 minutes from the formation of the molten mixture.

2. The process of claim 1 in which the said chelate-forming metal is selected from the class consisting of chromium, copper, cobalt, aluminum, iron and nickel.

3. The process of claim 1 in which the said molten mixture is formed into a thin shaped structure.

4. The process of claim 1 in which about 2 mols of the metallic salt are present for each mol of the dianhydride.

5. The process of claim 1 in which at least about 75% of the dicarboxylic acid substituents of the polyester is that of terephthalic acid.

*Table I*

DYEING OF FABRICS PREPARED FROM MODIFIED POLYETHYLENE TEREPHTHALATE YARNS

| Metalic Salt | Parts by Weight | Dyestuff | Color of Dyed Fabric |
|---|---|---|---|
| 1. Aluminum Triacetate | 3.1 | Alizarin | Red. |
| 2. Ferrous Acetate | 2.6 | (naphthol with N—OH and =O, HO— substituent) | Green. |
| 3. Cobaltous Acetate | 2.7 | (OH, HO, CH₃, C, N=N—C—CONH—, $O_2N$ substituted aromatic compound) | Yellow. |
| 4. Nickel Acetate | 2.7 | 2,4-dinitrosoresorcinol | Brown. |
| 5. Cupric Acetate | 2.7 | (HO, COOH substituted azo compound —N=N—) | Brown. |

The yarns produced from the polymer of the present invention are suitable for the usual textile applications. They may be employed in the knitting or weaving of fabrics of all types as well as in the production of nonwoven, felt-like products produced by known methods. Their physical properties closely parallel those of their related unmodified polyester fibers. However, they have particular sensitivity toward chelatable dyes as defined 6. The process of claim 1 in which the temperature of the melt is about 250° C. to 300° C.

7. The process of claim 1 in which the mixture is extruded into a thin shaped article within about 15 minutes from the time it is placed in the molten state.

8. The process of claim 1 in which the polyester reacted with the dianhydride has an intrinsic viscosity of at least 0.3.

9. The process of claim 8 in which the intrinsic viscosity is at least 0.5.

10. The process of claim 1 in which the dianhydride is present in the amount of from 0.5 to 5 mol percent based on the dicarboxylic acid of the residue in the polyester.

11. The product of claim 1 in the form of a film.

12. The product of claim 1 in the form of a filament.

References Cited in the file of this patent

UNITED STATES PATENTS

| | | |
|---|---|---|
| 2,437,232 | Rothrock | Mar. 2, 1948 |
| 2,945,010 | Caldwell et al. | July 12, 1960 |